United States Patent
Wu et al.

(10) Patent No.: US 8,761,688 B2
(45) Date of Patent: Jun. 24, 2014

(54) RADIO FREQUENCY CIRCUIT AND SIGNAL TRANSMISSION METHOD

(75) Inventors: Wei-Yang Wu, Taoyuan County (TW); Wei-Chien Chen, Taoyuan County (TW); Chien-Hua Ma, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 192 days.

(21) Appl. No.: 13/155,921

(22) Filed: Jun. 8, 2011

(65) Prior Publication Data

US 2012/0315861 A1 Dec. 13, 2012

(51) Int. Cl.
*H04B 1/38* (2006.01)

(52) U.S. Cl.
USPC ............ 455/73; 455/78; 455/101; 455/575.1; 455/562.1; 455/226.1; 455/502; 375/149; 375/326; 327/156; 327/159; 331/16

(58) Field of Classification Search
USPC ............... 455/73, 78, 101, 226.1, 575.7, 502, 455/562.1; 331/16; 375/149, 326; 327/156, 327/159
See application file for complete search history.

(56) References Cited

U.S. PATENT DOCUMENTS

| | | | | |
|---|---|---|---|---|
| 7,499,684 B2 * | 3/2009 | Cavin | ............................. | 455/141 |
| 7,587,222 B2 * | 9/2009 | Trachewsky et al. | ....... | 455/553.1 |
| 7,826,865 B2 * | 11/2010 | Rofougaran | ............... | 455/552.1 |
| 7,869,778 B2 * | 1/2011 | Cavin | ............................. | 455/141 |
| 7,924,944 B2 * | 4/2011 | Vassiliou et al. | ............... | 375/316 |
| 8,014,820 B2 * | 9/2011 | Trachewsky et al. | ....... | 455/553.1 |
| 8,023,913 B2 * | 9/2011 | Cavin | ............................. | 455/141 |
| 8,086,185 B2 * | 12/2011 | Rousu et al. | ............... | 455/67.11 |
| 8,126,408 B2 * | 2/2012 | Ahrony et al. | ................ | 455/101 |
| 2008/0299930 A1 | 12/2008 | Rofougaran et al. | | |
| 2010/0225414 A1 * | 9/2010 | Gorbachov | .................... | 333/101 |
| 2010/0238075 A1 | 9/2010 | Pourseyed | | |
| 2011/0045786 A1 | 2/2011 | Leinonen et al. | | |
| 2012/0306716 A1 * | 12/2012 | Satake et al. | .................. | 343/841 |

FOREIGN PATENT DOCUMENTS

CN 101227201 7/2008

OTHER PUBLICATIONS

Extended Search Report from corresponding European Application No. 12155830.8 dated Sep. 17, 2012.
Office Action from Chinese Appln. No. 201110257346.6 dated Feb. 8, 2014. Partial English translation attached.

* cited by examiner

*Primary Examiner* — Marceau Milord
(74) *Attorney, Agent, or Firm* — Grossman, Tucker, Perreault & Pfleger, PLLC

(57) ABSTRACT

A radio frequency circuit and a signal transmission method are provided. The radio frequency circuit comprises a primary antenna, a secondary antenna and a radio frequency integrated circuit. The primary antenna is electrically coupled to the radio frequency integrated circuit to transmit and receive at least one transmission/reception signal. The secondary antenna is electrically coupled to the radio frequency integrated circuit to receive at least one diversity reception signal. The radio frequency integrated circuit is configured to receive a specific diversity reception signal via the primary antenna and to transmit and receive a specific transmission/reception signal via the secondary antenna.

25 Claims, 3 Drawing Sheets

RADIO FREQUENCY CIRCUIT AND SIGNAL TRANSMISSION METHOD

REPRESENTATIVE FIGURE (i) Representative Figure: FIG. 1
(ii) Brief description of reference numerals of the representative figure:
1: radio frequency circuit
101: first transmission path
102: second transmission path
103-110: transmission paths
11: primary antenna
111: specific DRX signal
112-116: TRX signals
13: secondary antenna
131: specific TRX signal
132-134: DRX signals
15: exchange circuit
17: exchange circuit
19: radio frequency integrated circuit (RFIC)

CHEMICAL FORMULA BEST CHARACTERIZING THE INVENTION

None

DESCRIPTION OF THE INVENTION

1. Field of the Invention

The subject application relates to a radio frequency (RF) circuit and a signal transmission method. More particularly, the subject application relates to a radio frequency circuit and a signal transmission method that allow for reducing the difficulty in designing an antenna.

2. Descriptions of the Related Art

With development and advancement of wireless communication technologies, mobile phone systems have gradually evolved from the early Advanced Mobile Phone Systems (AMPSs) into the 2nd-generation (2G) mobile communication systems and further into the 3rd-generation (3G) mobile communication systems that are currently available as well as the 4th-generation (4G) mobile communication systems such as the Long Term Evolution (LTE) communication systems and Worldwide Interoperability for Microwave Access (WiMax) communication systems. In the evolution of the mobile phone systems, the radio spectrum that is used is increased continuously and, correspondingly, more and more frequency bands must be supported by a mobile device. This means that more antennas must be used in the mobile device to receive signals of different frequency bands or that each antenna must cover a wider frequency range. This results in an increased volume of the mobile device and also greater difficulty in designing the antennas.

Generally in a multi-input multi-output (MIMO) transmission architecture, a primary antenna and a secondary antenna are disposed. Meanwhile, in a conventional radio frequency circuit architecture, all radio frequency transmission/reception paths (RF TRX paths) are connected to the primary antenna and all radio frequency diversity reception paths (RF DRX paths) are connected to the secondary antenna, so the primary antenna must provide higher performance while the secondary antenna may provide lower performance. Generally, the primary antenna must provide a larger bandwidth, and the secondary antenna may have an antenna gain lower than that of the primary antenna by 3 dB to 6 dB.

However, if the conventional radio frequency circuit architecture is still used in the LTE communication system, a low-band bandwidth of the primary antenna will be significantly increased. Therefore, if the operating frequency band of the LTE communication system is to be covered within a reception range of the antenna, then the built-in antennae of the mobile device would fail to provide such a large bandwidth due to restrictions on the volume and use of the mobile device.

Accordingly, an urgent need exists in the art to design a radio frequency circuit architecture for use in an LTE communication system, which can lower the bandwidth requirement on antennae in mobile devices so as to effectively decrease the space occupied by the antennae and reduce the difficulty in designing the antennae.

CONTENTS OF THE INVENTION

An objective of the subject application is to provide a radio frequency circuit. The radio frequency circuit comprises a radio frequency integrated circuit (RFIC), a primary antenna and a secondary antenna. The primary antenna is electrically coupled to the RFIC and is configured to transmit and receive at least one transmission/reception (TRX) signal. The secondary antenna is electrically coupled to the RFIC and is configured to receive at least one diversity reception (DRX) signal. The RFIC is further configured to receive a specific DRX signal via the primary antenna and transmit and receive a specific TRX signal via the secondary antenna.

Another objective of the subject application is to provide a signal transmission method for a radio frequency circuit. The radio frequency circuit comprises an RFIC, a primary antenna and a secondary antenna. The primary antenna is electrically coupled to the RFIC, and is configured to transmit and receive at least one TRX signal. The secondary antenna is electrically coupled to the RFIC, and is configured to receive at least one DRX signal. The signal transmission method comprises the following steps of: (a) enabling the RFIC to receive a specific DRX signal via the primary antenna; and (b) enabling the RFIC to transmit and receive a specific TRX signal via the secondary antenna.

The radio frequency circuit of the subject application uses the primary antenna to receive a specific DRX signal and uses the secondary antenna to transmit and receive a specific TRX signal, so a bandwidth of the primary antenna can be reduced effectively to reduce the difficulty in designing the primary antenna. Therefore, the subject application can overcome the shortcoming of the prior art that the built-in antennae of mobile devices cannot provide an adequate bandwidth, and meanwhile, can advantageously decrease the space occupied by the antennae and reduce the difficulty in designing the antenna.

The detailed technology and preferred embodiments implemented for the subject application are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It shall be appreciated that, in the following embodiments and the attached drawings, elements not directly related to the present invention are omitted from depiction; and dimensional relationships among individual elements in the attached drawings are illustrated only for ease of understanding but not to limit the actual scale.

A first embodiment of the present invention is a radio frequency circuit 1, a schematic view of which is depicted in FIG. 1. The radio frequency circuit 1 comprises a primary antenna 11, a secondary antenna 13, an exchange circuit 15, an exchange circuit 17, a radio frequency integrated circuit (RFIC) 19, a first transmission path 101, a second transmission path 102 and a plurality of transmission paths 103-110.

The primary antenna 11 is electrically coupled to the exchange circuit 15. The secondary antenna 13 is electrically coupled to the exchange circuit 17. The first transmission path 101 is electrically coupled to the exchange circuit 15 and the RFIC 19. The second transmission path 102 is electrically coupled to the exchange circuit 17 and the RFIC 19. The transmission paths 103-107 are electrically coupled to the exchange circuit 15 and the RFIC 19. The transmission paths 108-110 are electrically coupled to the exchange circuit 17 and the RFIC 19.

The primary antenna 11 is electrically coupled to the transmission paths 101 and 103-107 via the exchange circuit 15, and the exchange circuit 15 is configured to choose one or a combination of the transmission paths 101 and 103-107 for being electrically coupled to the primary antenna 11. The secondary antenna 13 is electrically coupled to the transmission paths 102 and 108-110 via the exchange circuit 17, and the exchange circuit 17 is configured to choose one or a combination of the transmission paths 102 and 108-110 for being electrically coupled to the secondary antenna 13.

It shall be particularly appreciated that, the first transmission path 101, the second transmission path 102 and the transmission paths 108-110 described in the subject application may comprise elements such as a filter, a mixer, a tuner, a demodulator or other elements for processing or demodulating a signal in order to transmit appropriate signals to the primary antenna 11, the secondary antenna 13 and the RFIC 19. Therefore, implementations of the first transmission path 101, the second transmission path 102 and the transmission paths 108-110 are not intended to limit the scope of the subject application.

The radio frequency circuit 1 of the subject application can be applied in a mobile device. For example, the mobile device may be a cell phone, a personal digital assistant (PDA), a personal notebook, a tablet personal computer or any other mobile device having the wireless communication function. Implementations of the mobile device are not intended to limit the scope of the subject application.

Hereinafter, how the radio frequency circuit 1 of the subject application transmits a signal will be described in detail. Firstly, the primary antenna 11 is configured to transmit and receive at least one transmission/reception (TRX) signal, and transmit the at least one TRX signal to the RFIC 19 via the transmission paths 103-107. In this embodiment, the primary antenna 11 is configured to transmit and receive the TRX signals 112-116. The secondary antenna 13 is configured to receive at least one diversity reception (DRX) signal, and transmit the at least one DRX signal to the RFIC 19 via the transmission paths 108-110. In this embodiment, the secondary antenna 13 is configured to receive the DRX signals 132-134.

Next, the primary antenna 11 is further configured to receive a specific DRX signal 111, and transmit the specific DRX signal 111 to the RFIC 19 via the first transmission path 101; and the secondary antenna 13 is further configured to transmit and receive a specific TRX signal 131, and transmit the specific TRX signal 131 to the RFIC 19 via the second transmission path 102. Finally, the RFIC 19 is configured to process the signals received from the first transmission path 101, the second transmission path 102 and the transmission paths 103-110. Likewise, the RFIC 19 may also be configured to output the specific TRX signal 131 to the second transmission path 102 for transmission from the secondary antenna 13, and output the TRX signals 112-116 to the transmission paths 103-107 respectively for transmission from the primary antenna 11.

It shall be appreciated that, the specific TRX signal 131, the TRX signals 112-116, the specific DRX signal 111 and the DRX signals 132-134 each are a transmission signal conforming to a mobile communication system specification, and each are transmitted within a pre-determined frequency range. For example, the specific TRX signal 131, the TRX signals 112-116, the specific DRX signal 111 and the DRX signals 132-134 each may be a transmission signal conforming to the universal mobile telecommunications system (UMTS) specification, the global system for mobile communications (GSM) specification or the Long Term Evolution (LTE) communication system specification, although the subject application is not limited thereto.

Hereinafter, signal transmissions of the radio frequency circuit 1 will be described with reference to a specific example. In this example, the TRX signal 112 is an UMTS B1 (Band 1) TRX signal; the TRX signal 113 is an UMTS B2 (Band 2) TRX signal; the TRX signal 114 is an UMTS B5 (Band 5) TRX signal; the TRX signal 115 is a GSM Quad-band TRX signal; the TRX signal 117 is an LTE B4 (Band 4) TRX signal; and the specific DRX signal 111 is an LTE B17 (Band 17) DRX signal. The TRX signals 112-116 and the specific DRX signal 111 are distributed within frequency ranges of 734 MHz to 960 MHz and 1710 MHz to 2170 MHz. Therefore, in order to transmit and receive the TRX signals 112-116 and receive the specific DRX signal 111, the primary antenna 11 must provide a bandwidth of 734 MHz to 960 MHz in the low-band range.

On the other hand, the DRX signal 132 is an LTE B4 DRX signal; the DRX signal 133 is an UMTS B2 DRX signal; the DRX signal 134 is an UMTS B5 DRX signal; and the specific TRX signal 131 is an LTE B17 TRX signal. The DRX signals 132-134 and the specific TRX signal 131 are distributed within frequency ranges of 704 MHz to 894 MHz and 1930 MHz to 2155 MHz. Therefore, in order to receive the DRX signals 132-134 and transmit and receive the specific TRX signal 131, the secondary antenna 13 must provide a bandwidth of 704 MHz to 894 MHz in the low-band range.

To describe the technical features of the subject application clearly, signal transmissions of a conventional radio frequency circuit will be described for comparison hereinafter. In the conventional radio frequency circuit, all radio frequency transmission and reception (TRX) paths are connected to a primary antenna, and all radio frequency diversity reception (DRX) paths are connected to a secondary antenna. Therefore, in this example, the LTE B17 TRX signal is transmitted and received via the primary antenna, and the LTE B 17 DRX signal is received via the secondary antenna. The LTE B 17 TRX signal has a frequency range of 704 MHz to 746 MHz, and the LTE B17 DRX signal has a frequency range of 734 MHz to 746 MHz. Thus, the primary antenna must provide a bandwidth of 704 MHz to 960 MHz in the low-band range, i.e., must provide a bandwidth ratio of about 30.6%. In contrast, the primary antenna 11 of the radio frequency circuit of the subject application only needs to provide a bandwidth ratio of about 26.7% (734 MHz to 960 MHz) in the low-band range. Therefore, the radio frequency circuit of the subject application can effectively lower the bandwidth requirement on the primary antenna.

Furthermore, referring to FIG. 2, in the LTE communication system specification, B17 has an operating frequency band of 704 MHz to 746 MHz (i.e. a frequency band 217), in which 704 MHz to 716 MHz is a transmission frequency band (i.e., a frequency band 217a) and 734 MHz to 746 MHz is a reception frequency band (i.e., a frequency band 217b). By exchanging the transmission paths of the LTE B17 TRX signal and the LTE B17 DRX signal, the radio frequency circuit 1 of the subject application uses the secondary antenna 13 to transmit and receive the LTE B 17 TRX signal and uses the primary antenna 11 to receive the LTE B 17 DRX signal. Thereby, the primary antenna 11 only needs to provide a transmission bandwidth of the LTE B17 DRX signal (i.e., the frequency band 217b); and the LTE B17 TRX signal having a wider frequency range is transmitted via the secondary antenna 13 (i.e., a transmission bandwidth of the frequency band 217 is provided by the secondary antenna 13).

In other words, the primary antenna 11 operates in a first operating frequency band 201 (i.e., 734 MHz to 960 MHz in this embodiment); and the secondary antenna 13 operates in a second operating frequency band 202 (i.e., 704 MHz to 894 MHz in this embodiment). There is a non-overlapping frequency band 203 (i.e., 704 MHz to 734 MHz) located between the first operating frequency band 201 and the second operating frequency band 202, and the non-overlapping frequency band 203 is lower than the first operating frequency band 201. The secondary antenna 13 transmits a specific TRX signal (i.e., the LTE B17 TRX signal in this embodiment) over the non-overlapping frequency band 203.

On the other hand, the performance requirement on the secondary antenna 13 may be usually lower than that on the primary antenna 11. Specifically, the primary antenna 11 has a first antenna gain, and the secondary antenna 13 has a second antenna gain; and the second antenna gain may be lower than the first antenna gain by about 3 dB, although it is not merely limited to 3 dB. Thus, the radio frequency circuit architecture of the subject application can significantly reduce the difficulty in designing the primary antenna built in the mobile device without increasing the difficulty in designing the secondary antenna. However, in some cases, the second antenna gain may also be higher than the first antenna gain.

It shall be particularly appreciated that, although the above description is made with the LTE B17 signal as an example, the radio frequency circuit of the subject application can also apply to signals of other frequency bands, for example but not limited to an LTE B11 signal (having a transmission frequency band of 1427.9 MHz to 1447.9 MHz and a reception frequency band of 1475.9 MHz to 1495.9 MHz), an LTE B12 signal (having a transmission frequency band of 698 MHz to 716 MHz and a reception frequency band of 728 MHz to 746 MHz) or an LTE B21 signal (having a transmission frequency band of 1447.9 MHz to 1462.9 MHz and a reception frequency band of 1495.9 MHz to 1510.9 MHz).

Furthermore, the radio frequency circuit of the subject application can also apply to a signal having a transmission frequency band higher than a reception frequency band. For example, referring to FIG. 3, suppose that a specific TRX signal has an operating frequency band of 2300 MHz to 2500 MHz (i.e., a frequency band 311), in which a transmission frequency band is 2410 MHz to 2500 MHz (i.e., a frequency band 311a) and a reception frequency band is 2300 MHz to 2390 MHz (i.e., a frequency band 311b). In this case, the primary antenna operates in a first operating frequency band 301 which is supposed to be 1710 MHz to 2390 MHz in this embodiment; and the secondary antenna operates in a second operating frequency band 302 which is supposed to be 2010 MHz to 2500 MHz in this embodiment Likewise, there is a non-overlapping frequency band 303 (i.e., 2390 MHz to 2500 MHz) located between the first operating frequency band and the second operating frequency band, the non-overlapping frequency band 303 is higher than the first operating frequency band 301, and the secondary antenna transmits the specific TRX signal over the non-overlapping frequency band 303. Accordingly, the frequency range of the specific TRX signal is not intended to limit the scope of the subject application.

A second embodiment of the present invention is a signal transmission method for a radio frequency circuit. The radio frequency circuit comprises an RFIC, a primary antenna and a secondary antenna. The primary antenna is electrically coupled to the RFIC, and is configured to transmit and receive at least one TRX signal. The secondary antenna is electrically coupled to the RFIC, and is configured to receive at least one DRX signal.

The signal transmission method of the second embodiment comprises the following steps. Firstly, step (a) is executed to enable the RFIC to receive a specific DRX signal via the primary antenna. Then, step (b) is executed to enable the RFIC to transmit and receive a specific TRX signal via the secondary antenna.

Furthermore, the radio frequency circuit may further comprise a first transmission path and a second transmission path. The first transmission path is electrically coupled to the primary antenna and the RFIC, and the second transmission path is electrically coupled to the secondary antenna and the RFIC. The step (a) of the signal transmission method is a step of enabling the RFIC to receive the specific DRX signal via the first transmission path from the primary antenna; and the step (b) is a step of enabling the RFIC to transmit and receive the specific TRX signal via the second transmission path from the secondary antenna.

Further, the primary antenna operates in a first operating frequency band, and the secondary antenna operates in a second operating frequency band. There is a non-overlapping frequency band located between the first operating frequency band and the second operating frequency band, and the non-overlapping frequency band is lower than the first operating frequency band. The step (b) is a step of enabling the secondary antenna to transmit the specific TRX signal over the non-overlapping frequency band. In another example, the non-overlapping frequency band may also be higher than the first operating frequency band.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions, by exchanging transmission paths of a specific TRX signal and a specific DRX signal, the subject application uses the primary antenna to receive a specific DRX signal and uses the secondary antenna to transmit and receive a specific TRX signal. As a result, a bandwidth of the primary antenna can be reduced effectively to reduce the difficulty in designing the primary antenna. Thereby, the subject application can overcome the shortcoming of the prior art that built-in antennae of mobile devices cannot provide an adequate bandwidth, and meanwhile, can advantageously decrease the space occupied by the antennae and reduce the difficulty in designing the antennae.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

BRIEF DESCRIPTION OF REFERENCE NUMERALS

Figure 1:
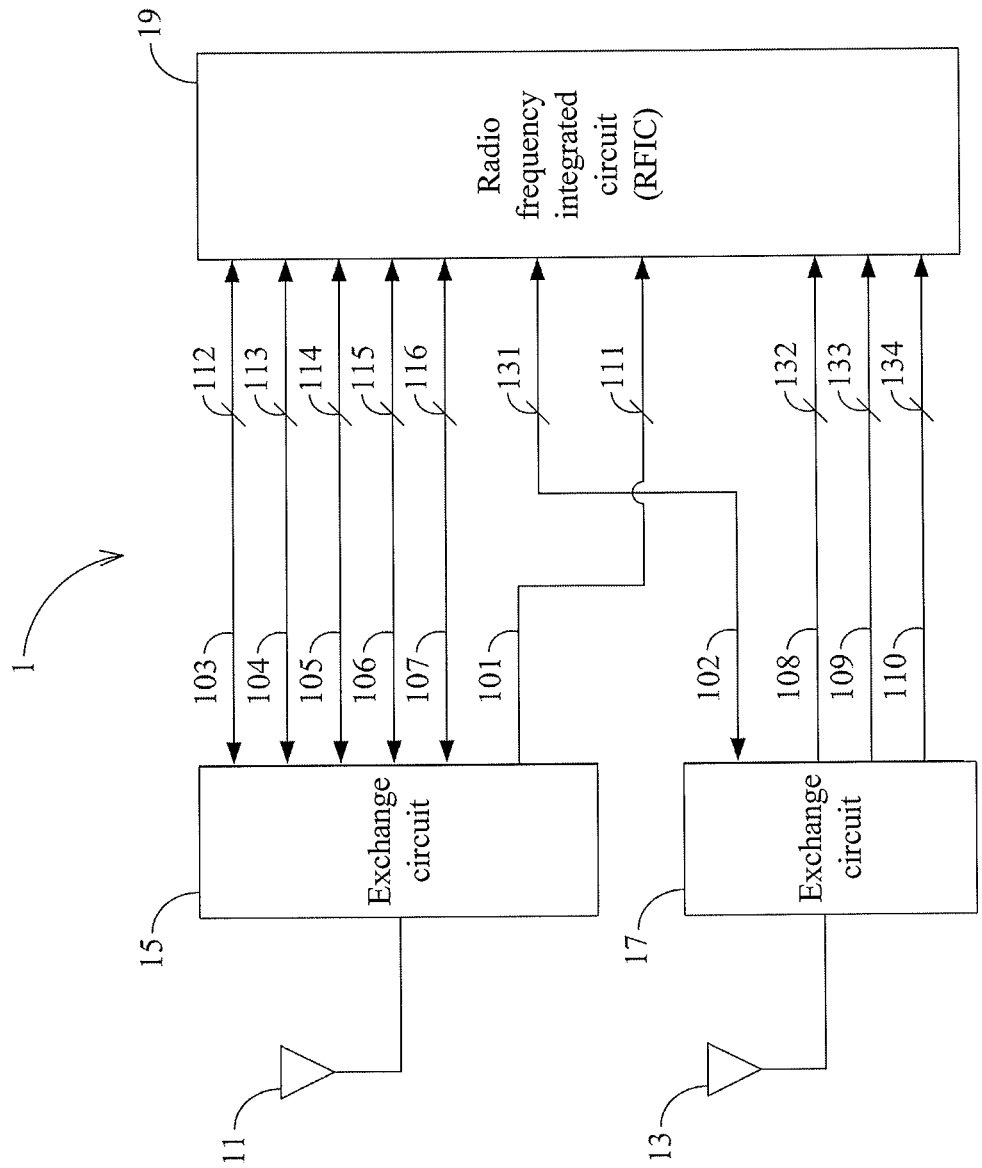
FIG. 1 is a schematic view of a first embodiment of the present invention.
Figure 2:
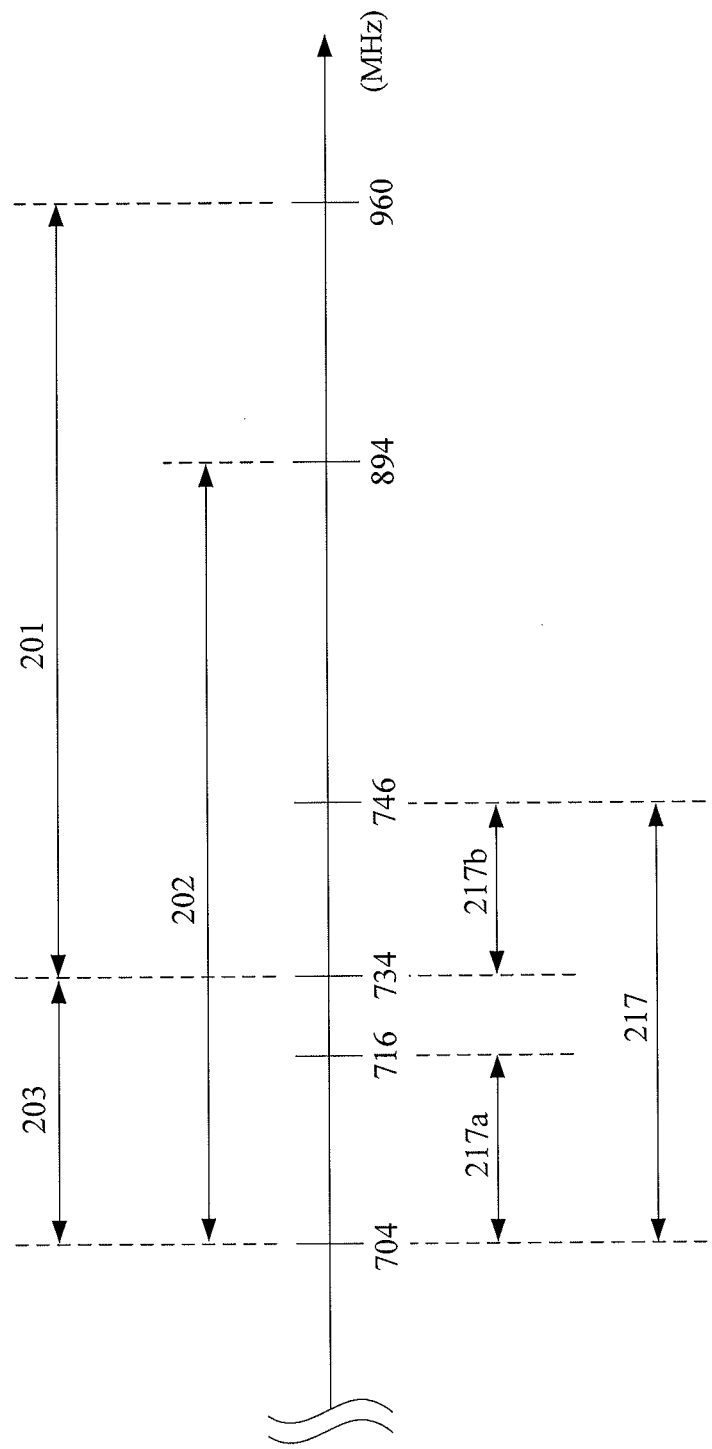
FIG. 2 is a schematic view of a frequency spectrum according to the first embodiment of the present invention.
Figure 3:
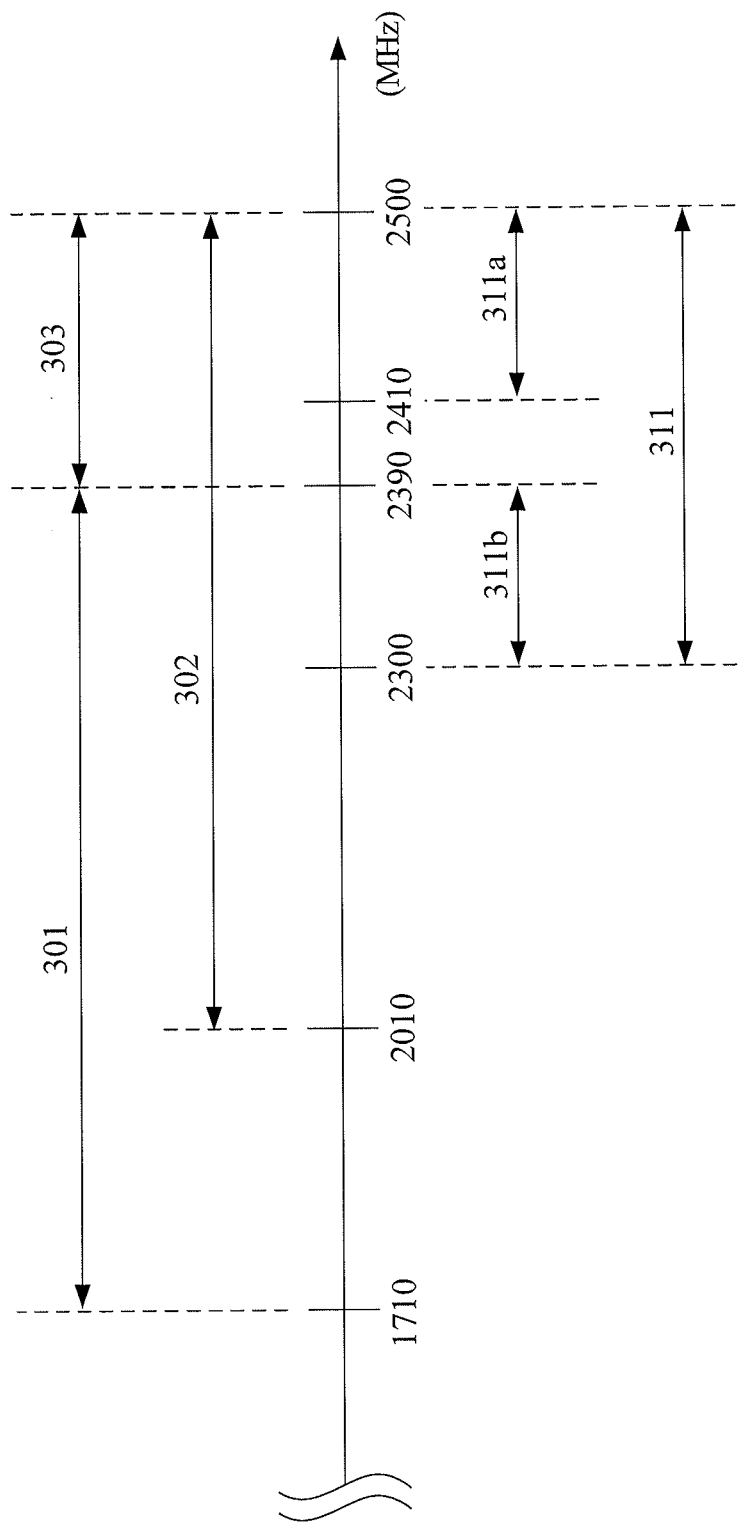
FIG. 3 is a schematic view of a frequency spectrum according to the first embodiment of the present invention.

1: radio frequency circuit
101: first transmission path
102: second transmission path
103-110: transmission paths
11: primary antenna
111: specific DRX signal
112-116: TRX signals
13: secondary antenna
131: specific TRX signal
132-134: DRX signals
15: exchange circuit
17: exchange circuit
19: radio frequency integrated circuit (RFIC)
201: first operating frequency band
202: second operating frequency band
203: non-overlapping frequency band
217: frequency band
217a: frequency band
217b: frequency band
301: first operating frequency band
302: second operating frequency band
303: non-overlapping frequency band
311: frequency band
311a: frequency band
311b: frequency band

What is claimed is:

1. A radio frequency circuit, comprising:
a radio frequency integrated circuit (RFIC);
a primary antenna, being electrically connected to the RFIC and being configured to transmit and receive at least one transmission and reception (TRX) signal; and
a secondary antenna, being electrically connected to the RFIC and being configured to receive at least one diversity reception (DRX) signal;
wherein the primary antenna is further configured to receive a specific DRX signal and the secondary antenna is further configured to transmit and receive a specific TRX signal; and
wherein the specific DRX signal is one of the DRX signals and the specific TRX signal is one of the TRX signals.

2. The radio frequency circuit as claimed in claim 1, further comprising:

a first transmission path, electrically coupled to the primary antenna and the RFIC, and configured to transmit the specific DRX signal; and
a second transmission path, electrically coupled to the secondary antenna and the RFIC, and configured to transmit the specific TRX signal.

3. The radio frequency circuit as claimed in claim 1, wherein the primary antenna operates in a first operating frequency band, the secondary antenna operates in a second operating frequency band, a non-overlapping frequency band located between the first operating frequency band and the second operating frequency band, the non-overlapping frequency band is lower than the first operating frequency band, and the secondary antenna transmits the specific TRX signal over the non-overlapping frequency band.

4. The radio frequency circuit as claimed in claim 1, wherein the primary antenna operates in a first operating frequency band, the secondary antenna operates in a second operating frequency band, a non-overlapping frequency band located between the first operating frequency band and the second operating frequency band, the non-overlapping frequency band is higher than the first operating frequency band, and the secondary antenna transmits the specific TRX signal over the non-overlapping frequency band.

5. The radio frequency circuit as claimed in claim 1, wherein the primary antenna has a first antenna gain, the secondary antenna has a second antenna gain, and the second antenna gain is lower than the first antenna gain.

6. A signal transmission method for a radio frequency circuit, the radio frequency circuit comprising an RFIC, a primary antenna and a secondary antenna, the primary antenna being electrically connected to the RFIC, and being configured to transmit and receive at least one TRX signal, and the secondary antenna being electrically connected to the RFIC, and being configured to receive at least one DRX signal, wherein the specific DRX signal is one of the DRX signals and the specific TRX signal is one of the TRX signals, the signal transmission method comprising the following steps of:

(a) enabling the primary antenna to receive a specific DRX signal; and
(b) enabling the secondary antenna to transmit and receive a specific TRX signal.

7. The signal transmission method as claimed in claim 6, wherein the radio frequency circuit further comprises a first transmission path and a second transmission path, the first transmission path is electrically connected to the primary antenna and the RFIC as well as configured to transmit the specific DRX signal, and the second transmission path is electrically connected to the secondary antenna and the RFIC as well as configured to transmit the specific TRX signal.

8. The signal transmission method as claimed in claim 6, wherein the primary antenna operates in a first operating frequency band, the secondary antenna operates in a second operating frequency band, a non-overlapping frequency band located between the first operating frequency band and the second operating frequency band, the non-overlapping frequency band is lower than the first operating frequency band, and the step (b) is a step of enabling the secondary antenna to transmit the specific TRX signal over the non-overlapping frequency band.

9. The signal transmission method as claimed in claim 6, wherein the primary antenna operates in a first operating frequency band, the secondary antenna operates in a second operating frequency band, a non-overlapping frequency band located between the first operating frequency band and the second operating frequency band, the non-overlapping frequency band is higher than the first operating frequency band, and the step (b) is a step of enabling the secondary antenna to transmit the specific TRX signal over the non-overlapping frequency band.

10. The signal transmission method as claimed in claim 6, wherein the primary antenna has a first antenna gain, the secondary antenna has a second antenna gain, and the second antenna gain is lower than the first antenna gain.

11. The signal transmission method as claimed in claim 6, wherein the primary antenna has a first antenna gain, the secondary antenna has a second antenna gain, and the second antenna gain is higher than the first antenna gain.

12. A radio frequency circuit, comprising:
  a radio frequency integrated circuit (RFIC);
  a primary antenna, being electrically connected to the RFIC and being configured to transmit and receive at least one transmission and reception (TRX) signal; and
  a secondary antenna, being electrically connected to the RFIC and being configured to receive at least one diversity reception (DRX) signal;
    wherein the primary antenna is further configured to receive a specific DRX signal and the secondary antenna is further configured to transmit and receive a specific TRX signal;
    wherein the specific DRX signal is one of the DRX signals and the specific TRX signal is one of the TRX signals; and
    wherein the primary antenna operates in a first operating frequency band, the secondary antenna operates in a second operating frequency band, there is a non-overlapping frequency band between the first operating frequency band and the second operating frequency band, the non-overlapping frequency band is lower than the first operating frequency band, and the secondary antenna transmits the specific TRX signal by the non-overlapping frequency band.

13. The radio frequency circuit as claimed in claim 12, further comprising:
  a first transmission path, being electrically connected to the primary antenna and the RFIC, and being configured to transmit the specific DRX signal; and
  a second transmission path, being electrically connected to the secondary antenna and the RFIC, and being configured to transmit the specific TRX signal.

14. The radio frequency circuit as claimed in claim 12, wherein the primary antenna has a first antenna gain, the secondary antenna has a second antenna gain, and the second antenna gain is lower than the first antenna gain.

15. A radio frequency circuit, comprising:
  a radio frequency integrated circuit (RFIC);
  a primary antenna, being electrically connected to the RFIC and being configured to transmit and receive at least one transmission and reception (TRX) signal; and
  a secondary antenna, being electrically connected to the RFIC and being configured to receive at least one diversity reception (DRX) signal;
    wherein the primary antenna is further configured to receive a specific DRX signal and the secondary antenna is further configured to transmit and receive a specific TRX signal;
    wherein the specific DRX signal is one of the DRX signals and the specific TRX signal is one of the TRX signals; and
    wherein the primary antenna operates in a first operating frequency band, the secondary antenna operates in a second operating frequency band, there is a non-overlapping frequency band between the first operating frequency band and the second operating frequency band, the non-overlapping frequency band is higher than the first operating frequency band, and the secondary antenna transmits the specific TRX signal by the non-overlapping frequency band.

16. The radio frequency circuit as claimed in claim 15, further comprising:
  a first transmission path, being electrically connected to the primary antenna and the RFIC, and being configured to transmit the specific DRX signal; and
  a second transmission path, being electrically connected to the secondary antenna and the RFIC, and being configured to transmit the specific TRX signal.

17. The radio frequency circuit as claimed in claim 15, wherein the primary antenna has a first antenna gain, the secondary antenna has a second antenna gain, and the second antenna gain is lower than the first antenna gain.

18. A signal transmission method for a radio frequency circuit, the radio frequency circuit comprising an RFIC, a primary antenna and a secondary antenna, the primary antenna being electrically connected to the RFIC, and being configured to transmit and receive at least one TRX signal, and the secondary antenna being electrically connected to the RFIC, and being configured to receive at least one DRX signal, wherein the specific DRX signal is one of the DRX signals and the specific TRX signal is one of the TRX signals, the signal transmission method comprising the following steps of:
  (a) enabling the primary antenna to receive a specific DRX signal; and
  (b) enabling the secondary antenna to transmit and receive a specific TRX signal; and
  wherein the primary antenna operates in a first operating frequency band, the secondary antenna operates in a second operating frequency band, there is a non-overlapping frequency band between the first operating frequency band and the second operating frequency band, the non-overlapping frequency band is lower than the first operating frequency band, and the step (b) is a step of enabling the secondary antenna to transmit the specific TRX signal by the non-overlapping frequency band.

19. The signal transmission method as claimed in claim 18, wherein the radio frequency circuit further comprises a first transmission path and a second transmission path, the first transmission path is electrically connected to the primary antenna and the RFIC as well as configured to transmit the specific DRX signal, and the second transmission path is electrically connected to the secondary antenna and the RFIC as well as configured to transmit the specific TRX signal.

20. The signal transmission method as claimed in claim 18, wherein the primary antenna has a first antenna gain, the secondary antenna has a second antenna gain, and the second antenna gain is lower than the first antenna gain.

21. The signal transmission method as claimed in claim 18, wherein the primary antenna has a first antenna gain, the secondary antenna has a second antenna gain, and the second antenna gain is higher than the first antenna gain.

22. A signal transmission method for a radio frequency circuit, the radio frequency circuit comprising an RFIC, a primary antenna and a secondary antenna, the primary antenna being electrically connected to the RFIC, and being configured to transmit and receive at least one TRX signal, and the secondary antenna being electrically connected to the RFIC, and being configured to receive at least one DRX signal, wherein the specific DRX signal is one of the DRX signals and the specific TRX signal is one of the TRX signals, the signal transmission method comprising the following steps of:

(a) enabling the primary antenna to receive a specific DRX signal; and (b) enabling the secondary antenna to transmit and receive a specific TRX signal; and wherein the primary antenna operates in a first operating frequency band, the secondary antenna operates in a second operating frequency band, there is a non-overlapping frequency band between the first operating frequency band and the second operating frequency band, the non-overlapping frequency band is higher than the first operating frequency band, and the step (b) is a step of enabling the secondary antenna to transmit the specific TRX signal by the non-overlapping frequency band.

23. The signal transmission method as claimed in claim 22, wherein the radio frequency circuit further comprises a first transmission path and a second transmission path, the first transmission path is electrically connected to the primary antenna and the RFIC as well as configured to transmit the specific DRX signal, and the second transmission path is electrically connected to the secondary antenna and the RFIC as well as configured to transmit the specific TRX signal.

24. The signal transmission method as claimed in claim 22, wherein the primary antenna has a first antenna gain, the secondary antenna has a second antenna gain, and the second antenna gain is lower than the first antenna gain.

25. The signal transmission method as claimed in claim 22, wherein the primary antenna has a first antenna gain, the secondary antenna has a second antenna gain, and the second antenna gain is higher than the first antenna gain.

* * * * *